United States Patent [19]

Gregory et al.

[11] Patent Number: 5,288,510
[45] Date of Patent: Feb. 22, 1994

[54] PALATABLE LOW SALT SUBSTITUTES

[76] Inventors: George Gregory, 5401 Ostrom Ave., Encino, Calif. 91316; Hakam Singh, Bradbury, Calif. 91010

[21] Appl. No.: 885,328

[22] Filed: May 18, 1992

[51] Int. Cl.$^5$ .................. A23L 1/237; A23L 1/302
[52] U.S. Cl. .................................. 426/72; 426/97; 426/648; 426/649; 426/650
[58] Field of Search ............... 426/649, 650, 93, 97, 426/72, 648

[56] References Cited

U.S. PATENT DOCUMENTS

| | | |
|---|---|---|
| 2,596,103 | 5/1952 | Ruskin . |
| 2,631,155 | 3/1963 | Ruskin . |
| 2,968,566 | 1/1961 | Munch . |
| 3,514,296 | 5/1970 | Frank et al. ................ 426/649 |
| 4,251,449 | 2/1981 | Schreur . |
| 4,297,375 | 10/1981 | Shackelford ............... 426/649 |
| 4,454,125 | 6/1984 | Demopoulos . |
| 4,915,962 | 4/1990 | Howard ..................... 426/649 |
| 4,931,305 | 6/1990 | Karppanen et al. ......... 426/649 |
| 4,963,387 | 10/1990 | Nakagawa et al. .......... 426/649 |
| 5,077,310 | 12/1991 | Yamashita et al. . |

FOREIGN PATENT DOCUMENTS

| | | |
|---|---|---|
| 846155 | 7/1970 | Canada . |
| 0205634A1 | 12/1986 | European Pat. Off. . |
| WO83/00081 | 1/1983 | World Int. Prop. O. . |

*Primary Examiner*—Donald E. Czaja
*Assistant Examiner*—Mary S. Mims
*Attorney, Agent, or Firm*—Pennie & Edmonds

[57] ABSTRACT

Palatable compositions are disclosed which are useful as salt substitutes comprising calcium ascorbate as the major component in combination with minor constituents including sodium chloride, sodium ascorbate, free ascorbic acid and potassium chloride. The palatable compositions are characterized by an appealing salt-like taste and have a pH in aqueous solution preferably in the range of about 4 to about 5.

17 Claims, No Drawings

PALATABLE LOW SALT SUBSTITUTES

FIELD OF THE INVENTION

The present invention relates to compositions suitable as salt substitutes. In particular, the palatable compositions of the present invention comprise a nutritious, unique blend of various salt forms or, optionally, free acid forms, of a select group of organic acids, including Vitamin C. The compositions of the present invention also contain, but in relatively minor amounts, potassium chloride and sodium chloride.

BACKGROUND OF THE INVENTION

The overconsumption of sodium chloride has been blamed for a wide range of human ailments including high blood pressure, coronary disease and heart attacks. Indeed, medical research has shown that a reduction in the amount of sodium salt intake can be accompanied by a corresponding decrease in the blood pressure of hypertensive patients. Thus, great emphasis has been placed on low "salt" diets in which most, if not all, the sources of sodium chloride salt are eliminated. Many products abound in which the major constituent of the low "salt" formulation or salt substitute is potassium chloride or sodium iodide.

For example, "a sodium-free yet saline tasting composition of matter" is disclosed in U.S. Pat. No. 2,968,566. Potassium chloride contributes about seventy percent by weight of the compositions described in particular examples of this patent, although the claimed composition can comprise from about forty to about ninety parts potassium chloride. Calcium ascorbate is only a minor constituent of the compositions disclosed in this patent. Language reciting a limitation of "from about four to about fifteen parts" of ascorbate (either as calcium ascorbate or as free ascorbic acid) appears as a specific element of the claims of this patent. Such a high proportion of potassium chloride, such as that disclosed in this patent, renders the resulting composition inherently susceptible to the bitter after taste of potassium chloride.

Vitamin C and its salts, including calcium ascorbate, are, of course, quite old in the art and have been utilized most commonly as stabilizers or preservatives, as well as in vitamin supplements. Vitamin C has also been the subject of inventions relating to various granulation methods. For instance, Canadian Patent Number 846,155 discloses a method of granulating ascorbic acid with an alkali metal chloride. More recently, U.S. Pat. No. 5,077,310 discloses granulation products of calcium ascorbate which also contains a number of solid organic acids, including citric acid and ascorbic acid. The pH of the granulated product of this patent is preferably in the range of 5.5 to 7.0, and the product, thus, is described as being "prevented from being colored."

There, thus, remains a need for a dietary low "salt" substitute that possesses substantially all the desirable olfactory characteristics of conventional table salt, while significantly lowering the intake of sodium chloride. The discovery of such a palatable composition that is, in addition, able to provide nutritional amounts of calcium and Vitamin C would be a significant achievement.

SUMMARY OF THE INVENTION

To the great surprise of the present inventors, the desirable palatable, dietary and nutritional characteristics, stated above, can be obtained in a composition having, as a principal component, the calcium salt of ascorbic acid. In particular, a palatable composition has been discovered which is suitable as a salt substitute and which comprises a mixture of about forty to about sixty percent by weight of the mixture (wt %) of the calcium salt of ascorbic acid, about five to about twenty-five wt % of the sodium salt of ascorbic acid, about fifteen to about twenty wt % of sodium chloride and about one to about two wt % of potassium chloride. The palatable composition of the present invention may further contain free ascorbic acid in an amount that is up to about fifteen percent by weight of the mixture.

In a specific embodiment of the present invention, the palatable composition may also contain, in addition to the components described, above, the free acid, calcium salt, potassium salt, sodium salt or combinations thereof of at least one of the supplemental acids selected from the group consisting of gluconic acid, citric acid, tartaric acid or glutamic acid.

Consistent with the objectives of the present invention, the inventors have further found that palatable compositions, having a preferred salty and nonbitter taste, include those with a pH value of about 3.5 to about 5.5, most preferably, about 4 to about 5.

Yet another objective of the present invention relates to providing a method of enhancing the flavor of comestible solid or liquid matter comprising the addition of an effective flavor-enhancing amount of at least one of the various palatable low "salt" substitute compositions disclosed or equivalent to those disclosed in the present specification.

It is a further objective of the present invention to provide palatable compositions that resist discoloration and absorption of atmospheric moisture.

Any further objectives of the present invention will be apparent to the reader skilled in the art upon further reflection of the contents of the present disclosure, including the detailed description, immediately following, which serves merely as a further illustration of specific embodiments of the instant invention.

DETAILED DESCRIPTION OF THE INVENTION

As described previously above, the present invention relates to a low "salt" substitute that possesses substantially all the desirable olfactory characteristics of conventional table salt, while significantly lowering the intake of sodium chloride. In addition, the palatable composition of the present invention, provides nutritious amounts of an essential vitamin, Vitamin C, and an important dietary supplement, calcium ion. All this is obtained from a composition comprising a mixture of about forty to about sixty percent by weight of the mixture of the calcium salt of ascorbic acid, about five to about twenty-five percent by weight of the mixture of the sodium salt of ascorbic acid, about fifteen to about twenty percent by weight of the mixture of sodium chloride and about one to about two percent by weight of the mixture of potassium chloride. The palatable composition of the instant invention may further comprise from zero, or close to zero, to about fifteen percent by weight of the mixture of free ascorbic acid.

The calcium ascorbate component of the instant invention is preferably in crystalline granular form (See, for example, U.S. Pat. No. 4,251,449, the disclosure of which is incorporated in its entirety by reference herein) or, further, can be in the form of a dihydrate (See, for example, U.S. Pat. No. 2,596,103 and 2,631,155, the disclosures of which are incorporated in their entirety by reference herein).

In a preferred embodiment of the instant invention, the pH of 3.5 grams of the palatable composition, when dissolved in 100 mL of distilled deionized water, should fall in the range of about 3.5 to about 5.5, preferably about 4 to about 5. Such preferred compositions have a more appealing, agreeable taste.

Other preferred compositions include those in which the amount of the sodium salt of ascorbic acid and the amount of the free ascorbic acid are approximately equal in the mixture that also contains calcium ascorbate, sodium chloride and potassium chloride. Other suitable salt substitute compositions contain a mixture in which the amount of the calcium ascorbate present is about equal to the sum of the respective amounts of sodium ascorbate, free ascorbic acid, if present, and sodium chloride.

The following Table lists specific examples of preferred mixtures suitable for incorporation into the palatable compositions contemplated by the instant invention. The pH of a 3.5 percent by weight aqueous solution of the mixture of Ex. 1 was found to be 4.35, while that of a 3.5 percent by weight aqueous solution of the mixture of Ex. 2 was found to be 4.55.

TABLE

PREFERRED MIXTURES OF SALTS AND ASCORBATES

| | Ingredient | Percent by Weight of Mixture |
|---|---|---|
| Ex. 1 | sodium chloride | 17.3 |
| | calcium ascorbate[a] | 51.8 |
| | sodium ascorbate | 14.9 |
| | ascorbic acid | 14.9 |
| | potassium chloride | 1.0 |
| Ex. 2 | sodium chloride | 19.8 |
| | calcium ascorbate[a] | 49.5 |
| | sodium ascorbate | 14.8 |
| | ascorbic acid | 14.8 |
| | potassium chloride | 1.0 |

[a]As the dihydrate

Generally, the amount of sodium chloride by weight of the preferred mixture is about seven to about twenty times that of the potassium chloride present. Also, generally, the calcium ascorbate comprises about forty to about sixty percent by weight of the mixture, preferably about fifty percent.

In particular embodiments of the invention, the mixture of ascorbates and potassium chloride and sodium chloride is further supplemented by the free acid form of gluconic acid, citric acid, tartaric acid or glutamic acid. Alternatively, the calcium, potassium or sodium salts of these supplemental organic acids may be added. Likewise, any combination involving the free acid, calcium, potassium or sodium salts may be utilized. However, the presence of such supplemental ingredients are generally limited to about one to about ten percent by weight of the mixture, preferably about two to about six percent by weight.

The palatable composition of the present invention may further comprise other components that would have utility apparent to those of ordinary skill in the art. For instance, it may be useful to include binders (e.g., a water-soluble cellulose), a sugar, a repellant, a lubricant, other vitamins, flavoring agents, and the like.

The granulated composition should further be of a desirable size mesh, for example, in the range of about 20 mesh to about 80 mesh, preferably about 30 to about 50 mesh.

Preferred low salt compositions of the present invention may be prepared by the following method. Mixtures such as those listed in the Table, were ground in a pestle mortar until the powder had an average particle size of about 80 to about 100 mesh. To 10 grams of this finely powdered mixture was added 2 grams of distilled water with thorough mixing under nitrogen atmosphere with a glass spatula. The slurry thus obtained was allowed to stand at a temperature below 50° C. with nitrogen bubbling through it slowly (to maintain a substantially oxygen free atmosphere) until all of the water had evaporated. On evaporation, a hard crystalline crust was obtained which was then ground to about 30–50 mesh size crystallites. The resulting material was slightly flesh colored with no tendency to absorb moisture from the atmosphere and no tendency to discolor further.

It should be apparent to those skilled in the art that other compositions not specifically disclosed in the instant specification are, nevertheless, contemplated thereby. Such other compositions are considered to be within the scope and spirit of the present invention. Hence, the invention should not be limited by the description of the specific embodiments disclosed herein but only by the following claims.

What is claimed:

1. A palatable composition suitable as a salt substitute comprising a mixture of about forty to about sixty percent by weight of said mixture (wt %) of the calcium salt of ascorbic acid, about five to about twenty-five wt % of the sodium salt of ascorbic acid, about fifteen to about twenty wt % of sodium chloride and about one to about two wt % of potassium chloride.

2. The palatable composition of claim 1 in which said mixture further comprises up to about fifteen wt % of free ascorbic acid.

3. The palatable composition of claim 1 or 2 in which said calcium salt of ascorbic acid is in the form of a dihydrate.

4. The palatable composition of claim 1 or 2 having a pH in the range of about 3.5 to about 5.5 when 3.5 grams of said composition is dissolved in 100 mL of distilled deionized water.

5. The palatable composition of claim 1 or 2 having a pH in the range of about 4 to about 5 when 3.5 grams of said composition is dissolved in 100 mL of distilled deionized water.

6. The palatable composition of claim 2 in which the amount by wt % of said sodium salt of ascorbic acid and the amount by wt % of said free ascorbic acid are approximately equal.

7. The palatable composition of claim 2 in which the amount by wt % of said calcium salt of ascorbic acid is about equal to the sum of the amounts by wt % of said sodium salt of ascorbic acid, said free ascorbic acid and said sodium chloride.

8. The palatable composition of claim 1 or 2 in which the amount by wt % of said sodium chloride is about seven to about twenty times the amount by wt % of said potassium chloride.

9. The palatable composition of claim 1 or 2 in which about half the wt % of said mixture is comprised of said calcium salt of ascorbic acid.

10. A palatable composition suitable as a salt substitute comprising a mixture of about forty to about sixty percent by weight of said mixture (wt %) of the calcium salt of ascorbic acid, about five to about twenty-five wt % of the sodium salt of ascorbic acid, about fifteen to about twenty wt % of sodium chloride, about one to about two wt % of potassium chloride and, optionally, up to about fifteen wt % of free ascorbic acid, said composition further comprising the free acid, calcium salt, potassium salt, sodium salt or combination thereof of at least one of the supplemental acids selected from the group consisting of gluconic acid, citric acid or glutamic acid.

11. The palatable composition of claim 10 in which said free acid, calcium salt, potassium salt, sodium salt or combination thereof of at least one of said supplemental acids is present in about one to about ten wt % of said mixture.

12. The palatable composition of claim 10 in which said free acid, calcium salt, potassium salt, sodium salt or combination thereof of at least one of said supplemental acids is present in about two to about six wt % of said mixture.

13. A method of enhancing the flavor of a comestible solid or liquid matter comprising adding an effective flavor-enhancing amount of the palatable composition of claim 1, 2 or 10.

14. A method of preparing a palatable composition suitable as a salt substitute that is resistant to discoloration and the absorption of atmospheric moisture comprising providing an aqueous slurry of a powdery mixture of at least one salt of ascorbic acid, sodium chloride and potassium chloride, said powdery mixture having an average particle size of about 80–100 mesh, allowing the water of said slurry to evaporate in a substantially oxygen-free atmosphere under a stream of nitrogen, and grinding the resulting crust to provide a palatable composition of solid crystallites having a mesh size of about 30–50.

15. A salt substitute consisting essentially of about forty to sixty percent by weight of the calcium salt of ascorbic acid, about five to twenty-five percent by weight of the sodium salt of ascorbic acid, about fifteen to twenty percent by weight of sodium chloride, and about one to two percent by weight of potassium chloride, optionally including up to about fifteen percent by weight of ascorbic acid and at least one supplemental acid.

16. The salt substitute of claim 15 wherein the supplemental acid is gluconic acid, citric acid or glutamic acid and is present in an amount of about one to ten percent by weight.

17. The salt substitute of claim 15 wherein the free ascorbic acid is present in an amount approximately equal to that of the sodium ascorbate.

* * * * *